United States Patent
Shimizu

(10) Patent No.: US 8,050,557 B2
(45) Date of Patent: Nov. 1, 2011

(54) TRANSMISSION SYSTEM AND SYSTEM STARTUP METHOD

(75) Inventor: Katsuhiko Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 774 days.

(21) Appl. No.: 12/033,472

(22) Filed: Feb. 19, 2008

(65) Prior Publication Data

US 2008/0199179 A1 Aug. 21, 2008

(30) Foreign Application Priority Data

Feb. 21, 2007 (JP) ................................. 2007-040704

(51) Int. Cl.
H04B 10/08 (2006.01)
H04B 17/00 (2006.01)

(52) U.S. Cl. ......................................................... 398/25

(58) Field of Classification Search .................. None
See application file for complete search history.

(56) References Cited

U.S. PATENT DOCUMENTS

| 5,892,616 | A * | 4/1999 | Takahashi | 359/341.43 |
|---|---|---|---|---|
| 6,219,177 | B1 * | 4/2001 | Tamura | 359/341.1 |
| 6,359,726 | B1 * | 3/2002 | Onaka et al. | 359/337.1 |
| 2002/0176156 | A1 * | 11/2002 | Zahnley et al. | 359/341.4 |
| 2004/0131094 | A1 * | 7/2004 | Miremadi | 372/29.02 |
| 2004/0152432 | A1 * | 8/2004 | Gu | 455/136 |
| 2005/0213968 | A1 * | 9/2005 | Uda et al. | 398/30 |
| 2006/0056011 | A1 * | 3/2006 | Iizuka et al. | 359/337 |
| 2006/0171019 | A1 * | 8/2006 | Charlet et al. | 359/334 |
| 2007/0058241 | A1 * | 3/2007 | Chang et al. | 359/337.12 |

FOREIGN PATENT DOCUMENTS

| JP | 2003209864 A | 7/2003 |
|---|---|---|
| JP | 2006033542 A | 2/2006 |

* cited by examiner

Primary Examiner — Kenneth N Vanderpuye
Assistant Examiner — Jermaine Wilson

(57) ABSTRACT

An exemplary aspect of the invention is a transmitter for transmitting an optical signal, comprising a level comparing unit for measuring an input level of an entered optical signal, and determining whether the input level has exceeded a preset level and a controller for performing high-speed control of the level of an optical signal to be outputted when the input level exceeds the preset level.

7 Claims, 6 Drawing Sheets

TRANSMISSION SYSTEM AND SYSTEM STARTUP METHOD

This application is based upon and claims the benefit of priority from Japanese Patent Application No. 2007-040704 filed on Feb. 21, 2007 the content of which are incorporated by reference.

BACKGROUND ART

1. Technical Field

The present invention relates to a transmission system for transmitting signals, and a system startup method for starting the transmission system. In particular, the present invention relates to a transmission system for transmitting optical signals, and a system startup method for starting the transmission system.

2. Description of the Related Art

In general, in transmission systems adapted to transmit signals, a plurality of apparatuses are connected in series or in parallel. The plurality of apparatuses often have performance different from each other. Accordingly, the time from when these have been switched on until when the output levels of the optical signals outputted from the apparatuses reach a predetermined target level value (hereinafter referred to as startup time) is not uniform due to the response characteristics of devices built into each apparatus.

In apparatuses that are generally applied to transmission systems, output control is executed faster at startup time than at regular control time so that the target output level is attained as quickly as possible during signal conduction from the shutdown. Then, after the output level is settled to the target level value (after startup time), a switchover to low-speed output control is accomplished to move to normal operation.

FIG. 6 is a diagram showing an example of a related transmission system.

In the related transmission system shown in FIG. 6, an apparatus 901 and an apparatus 902 are connected in series. The apparatuses 901 and 902 are transmission apparatuses for transmitting optical signals, and optical signals outputted from the apparatus 901 (upstream) are entered into the apparatus 902 (downstream) located at the subsequent stage of the apparatus 901.

If the startup time of the apparatus 902 is longer than the startup time of the apparatus 901, two problems as described below may arise.

(1) The output level of an optical signal outputted from the apparatus 901 continues changing until the output level reaches an output target level value, and, as a result, the input level of an optical signal entered into the apparatus 902 also varies. In this case, the apparatus 902 cannot suppress a fluctuation in the input level. As a result, unnecessary output level fluctuation occurs in the apparatus 902. If other apparatuses are connected downstream from the apparatus 902, when the fluctuation is propagated downstream, further downstream the signal goes, the more unstable the optical level becomes. Therefore, the more the number of connected nodes, the longer the period of time the output level converges to the target level value would be.

(2) The input level of an optical signal entered into the apparatus 902 may be lower than a specified value until the output level of the optical signal outputted from the apparatus 901 reaches the target level value. Therefore, an alarm indicating that the level is low may be issued.

Hence, a technique has been considered in which the control of its own station is entered in a standby (stop) state until the fluctuation of a station located upstream from its own station is completed (e.g., Japanese Patent Laid-open Application Publication No. 2006-033542).

In addition, a technique has also been considered in which, in order to prevent an incorrect alarm from being notified, an alarm is masked until a predetermined time has elapsed from when an optical switch started switchover operation (e.g., Japanese Patent Laid-open Application Publication No. 2003-209864).

However, in the technique described in Japanese Patent Laid-open Application Publication No. 2006-033542, there is a problem that the startup time of the system becomes long because the control of its own station is entered in a standby (stop) state.

In addition, in the technique described in Japanese Patent Laid-open Application Publication No. 2003-209864, there is a problem that a signal to mask an alarm has to be generated. There is another problem that the time period over which an alarm is masked has to be set in advance.

SUMMARY

An exemplary object of the invention is to provide a transmission system and a system startup method capable of easily stabilizing the level of an optical signal outputted from the system, and reducing the startup time of the system. In addition, another exemplary object of the present invention is to provide a transmission system and a system startup method capable of preventing an incorrect alarm from being notified.

An exemplary aspect of the invention is a transmitter for transmitting an optical signal, comprising a level comparing unit for measuring an input level of an entered optical signal, and determining whether the input level has exceeded a preset level and a controller for performing high-speed control of the level of an optical signal to be outputted when the input level exceeds the preset level.

BRIEF DESCRIPTION OF THE DRAWINGS

The above and other objects, features and advantages of the present invention will become more apparent from the following detailed description when taken in conjunction with the accompanying drawings wherein.

EXEMPLARY EMBODIMENTS

1. First Exemplary Embodiment

Figure 1:
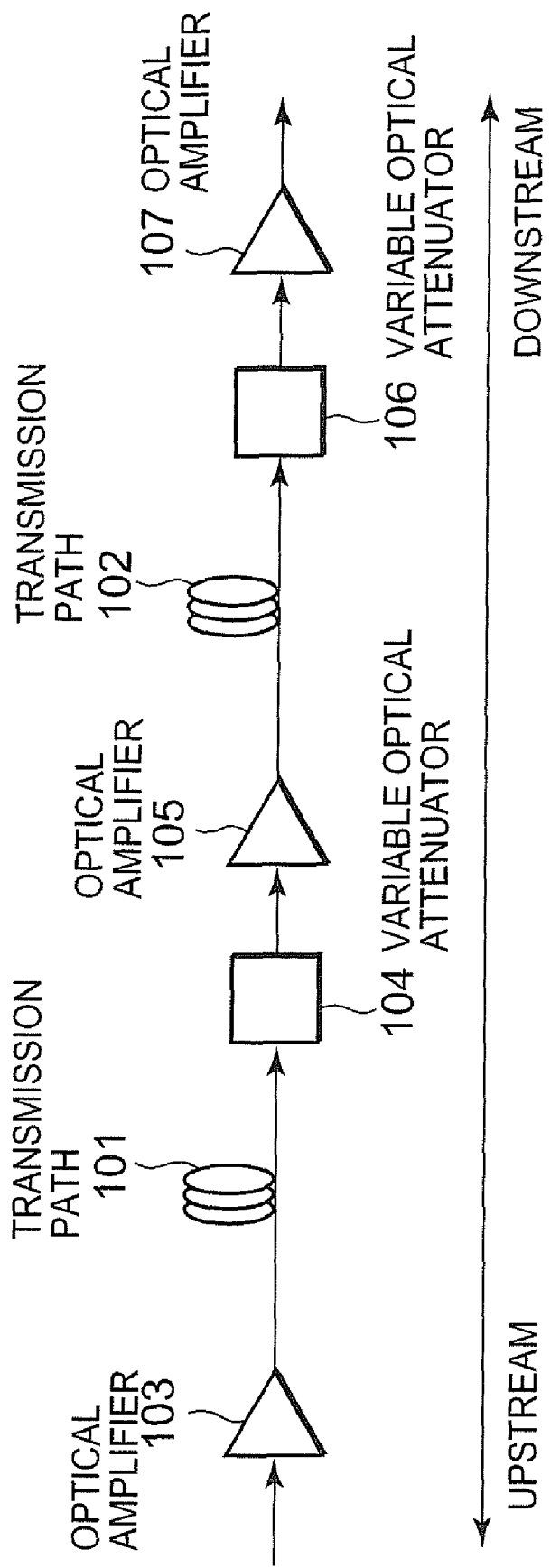
FIG. 1 is a diagram showing a first exemplary embodiment.

FIG. 1 is a diagram showing a first exemplary embodiment of a transmission system of the present invention.

As shown in FIG. 1, the present exemplary embodiment is comprised of optical amplifiers 103, 105 and 107, and variable optical attenuators 104 and 106, each of which is a transmission apparatus. The optical amplifier 103 and the variable optical attenuator 104 are connected through a transmission path 101. Further, the optical amplifier 105 and the variable optical attenuator 106 are connected through a transmission path 102.

The optical amplifiers 103, 105 and 107 amplify optical signals, which were outputted from an apparatus in the previous stage and attenuated in the transmission path, and output them to a transmission path in the subsequent stage.

The variable optical attenuators 104 and 106 increase and reduce the loss to cancel variation in the loss of the transmission path so that the signal level entered into the optical amplifier may fall within an optimal range.

The internal structure of the optical amplifiers 103, 105 and 107, and the variable optical attenuators 104 and 106, which are shown in FIG. 1, will be described below. Only portions characterizing the present invention will be described herein. Note that, since the portions characterizing the present invention are the same as the internal structure of any among the optical amplifiers 103, 105 and 107, and the variable optical attenuators 104 and 106, the internal structure of the optical amplifier 105 will be described as an example.

Figure 2:
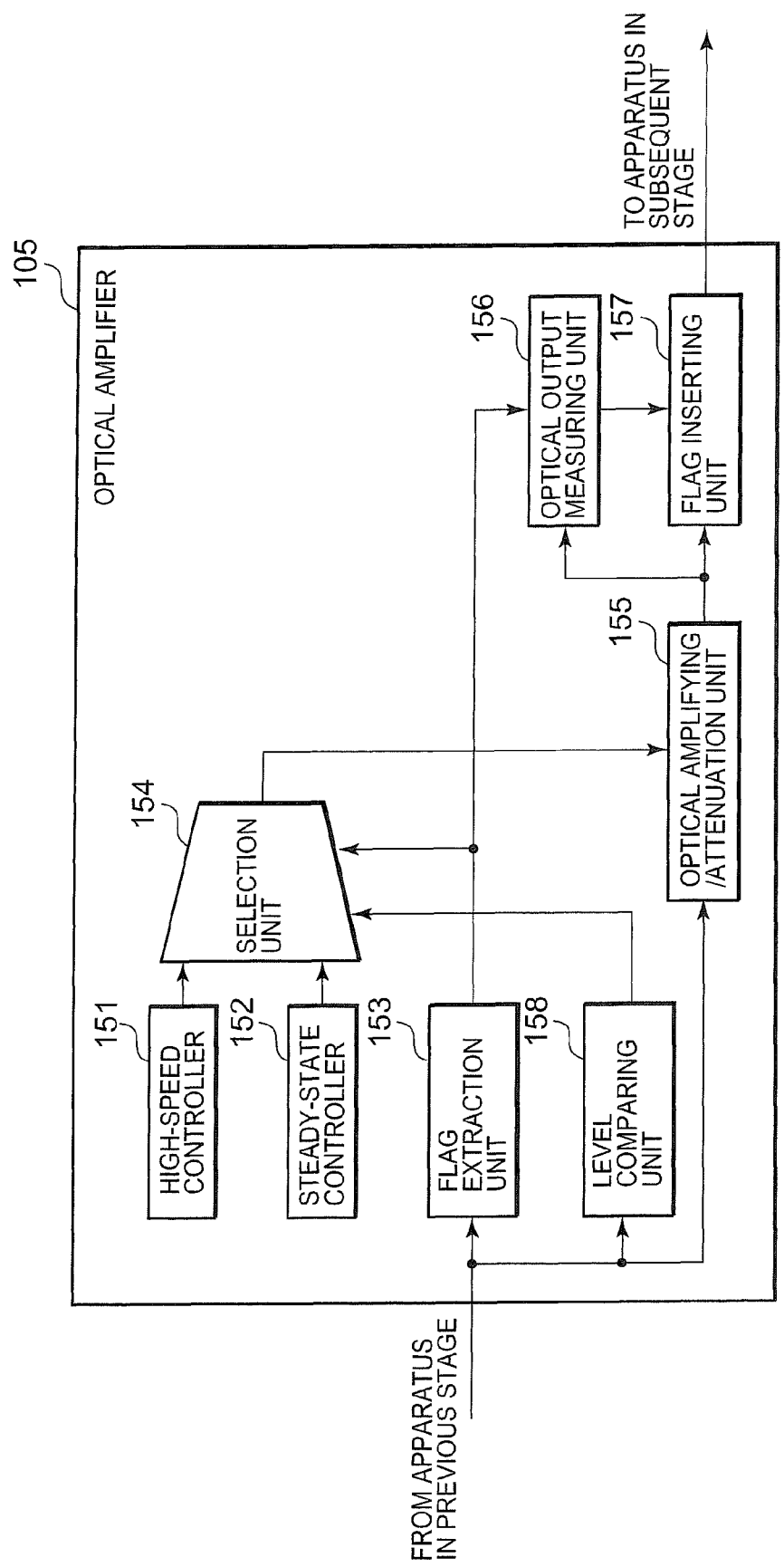
FIG. 2 is a diagram showing an example of the internal structure of an optical amplifier shown in FIG. 1.

FIG. 2 is a diagram showing an example of the internal structure of an optical amplifier 105 shown in FIG. 1. Note that, as described above, only the components characterizing the present invention are shown in FIG. 2.

As shown in FIG. 2, the optical amplifier 105 shown in FIG. 1 includes a high-speed controller 151, a steady-state controller 152, a flag extraction unit 153, a selection unit 154, an optical amplifying/attenuating unit 155, an optical output measuring unit 156, a flag inserting unit 157 and a level comparing unit 158.

The high-speed controller 151 performs control with a higher control speed than control in a steady state (hereinafter referred to as steady-state control).

The steady-state controller 152 performs steady-state control with steady-state speed.

Note that the high-speed controller 151 and the steady-state controller 152 may perform control to keep gain constant in order to suppress the fluctuation in gain caused by the signal level fluctuation in optical signals entered into the optical amplifier 105, such as automatic gain control. Alternatively, they may perform control to keep the level of the total output optical power of the optical amplifier 105 constant, such as automatic level control. In addition, Erbium Doped Fiber Amplifiers (EDFA) may be used for automatic gain control.

The flag extraction unit 153 extracts an output control completion flag from an optical signal outputted from an apparatus in the previous stage (the apparatus in the previous stage of the optical amplifier 105 is the variable optical attenuator 104). The output control completion flag is a flag to be outputted when the output level of an optical signal outputted from each apparatus is settled to a target level value. Regarding the signal format of the output control completion flag, 1 bit may be used for representation, or a predetermined signal format may be used. Note that as methods for notifying the apparatuses in subsequent stages of the output control completion flag, the scheme of overlapping with a transmission path monitoring signal (SV light), the method in which a signal notifying of the completion of output control in addition to the transmission signal light is multiplexed with a transmission signal and transmitted, or the like, can be considered.

The selection unit 154 selects either of the control by the high-speed controller 151 and the control by the steady-state controller 152 based on whether the output control completion flag has been extracted by the flag extraction unit 153. Here, until the output control completion flag is extracted by the flag extraction unit 153, the control by the high-speed controller 151 is selected, and after the output control completion flag is extracted by the flag extraction unit 153, the control by the steady-state controller 152 is selected.

The optical amplifying/attenuating unit 155 amplifies/attenuates the optical signal outputted by the apparatus in the previous stage based on the control selected by the selection unit 154.

The optical output measuring unit 156 measures the output level of the optical signal amplified/attenuated by the optical amplifying/attenuating unit 155, and determines whether the measured output level has reached a preset target level value.

The flag inserting unit 157 inserts the output control completion flag into the optical signal to be outputted when the optical output measuring unit 156 determines that the output level of the optical signal to be outputted has been settled to the target level value. As described above, the output control completion flag may be overlapped with a transmission path monitoring signal (SV light), or a signal notifying of the completion of output control, in addition to the transmission signal light, may be multiplexed with a transmission signal and transmitted.

The level comparing unit 158 measures the input level at which the optical signal outputted from the variable optical attenuator 104 is entered, which is a transmission apparatus connected to the previous stage of the optical amplifier 105, and compares the measured input level with a preset level. Then, the level comparing unit 158 determines whether the measured input level has exceeded the preset level.

A system startup method of the exemplary embodiment shown in FIG. 1 will be described below with reference to a sequence diagram.

Figure 3:
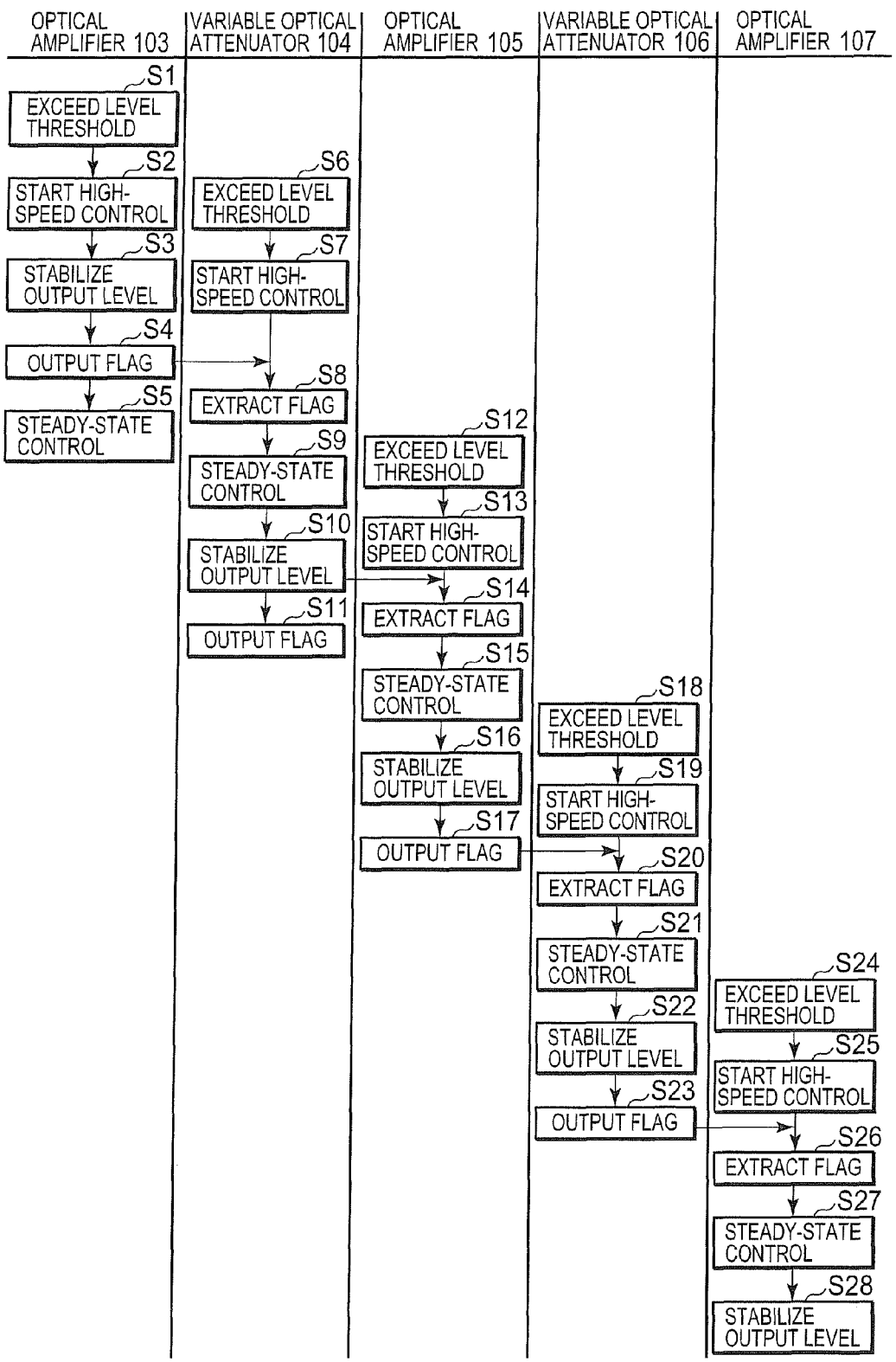
FIG. 3 is a sequence diagram for illustrating a system startup method in a transmission system shown in FIG. 1.

FIG. 3 is a sequence diagram for illustrating a system startup method in the transmission system shown in FIG. 1.

First, the optical amplifiers 103, 105 and 107, and the variable optical attenuators 104 and 106 are activated. After activation, the input level at which the optical signal outputted from the transmission apparatus in the previous stage is entered, which is connected to the previous stage of the optical amplifier 103, is measured by the level comparing unit 158 of the optical amplifier 103. When it is determined that the measured input level has exceeded the preset level (threshold) (step S1), the control by the high-speed controller 151 is selected by the selection unit 154 of the optical amplifier 103, and high-speed control is started (step S2).

When the optical output measuring unit 156 of the optical amplifier 103 measures the output level of the optical signal to be outputted, and determines that the output level of the optical signal to be outputted has been settled to the preset target level value (the optical output level is stabilized) (step S3), the output control completion flag is inserted into the optical signal to be outputted by the flag inserting unit 157 of the optical amplifier 103, and the optical signal is outputted to the variable optical attenuator 104 through the transmission path 101 (step S4). Subsequently, the selection unit 154 of the optical amplifier 103 selects the control by the steady-state controller 152 of the optical amplifier 103, and the control method of the optical amplifier 103 is switched from the high-speed control to the steady-state control (step S5).

On the other hand, in the variable optical attenuator 104, the level comparing unit 158 of the variable optical attenuator 104 measures the input level at which the optical signal outputted from the optical amplifier 103 is entered. When it is determined that the measured input level has exceeded the preset level (threshold) (step S6), the selection unit 154 of the variable optical attenuator 104 selects each of the controls by the high-speed controller 151, and the high-speed control is started (step S7).

Further, the flag extraction unit 153 of the variable optical attenuator 104 extracts an output control completion flag outputted from the optical amplifier 103 (step S8). The selection unit 154 of the variable optical attenuator 104 selects the control by the steady-state controller 152 of the variable optical attenuator 104, thus the control method of the variable optical attenuator 104 is switched from the high-speed control to the steady-state control (step S9). Then, the optical output measuring unit 156 of the variable optical attenuator 104 starts measuring the output level of the optical signal to be outputted. The optical output measuring unit 156 of the variable optical attenuator 104 determines that the output level of the optical signal to be outputted has been settled to the preset target level value (the optical output level is stabilized) (step S10). Then, the flag inserting unit 157 of the variable optical attenuator 104 inserts the output control completion flag into the optical signal to be outputted, and the optical signal is outputted to the optical amplifier 105 (step S11).

On the other hand, in the optical amplifier 105, the level comparing unit 158 of the optical amplifier 105 measures the input level at which the optical signal outputted from the variable optical attenuator 104 is entered. When it is determined that the measured input level has exceeded the preset level (threshold) (step S12), the selection unit 154 of the optical amplifier 105 selects each of the controls by the high-speed controller 151, and the high-speed control is started (step S13).

Further, the output control completion flag outputted from the variable optical attenuator 104 is extracted by the flag extraction unit 153 of the optical amplifier 105 (step S14). The selection unit 154 of the optical amplifier 105 selects the control by the steady-state controller 152 of the optical amplifier 105, and the control method of the optical amplifier 105 is switched from the high-speed control to the steady-state control (step S15). Then, the optical output measuring unit 156 of the optical amplifier 105 starts measuring the output level of the optical signal to be outputted. The optical output measuring unit 156 of the optical amplifier 105 determines that the output level of the optical signal to be outputted has been settled to the preset target level value (the optical output level is stabilized) (step S16). Subsequently, the flag inserting unit 157 of the optical amplifier 105 inserts the output control completion flag into the optical signal to be outputted, and the optical signal is outputted to the variable optical attenuator 106 through the transmission path 102 (step S17).

On the other hand, in the variable optical attenuator 106, the level comparing unit 158 of the variable optical attenuator 106 measures the input level at which the optical signal outputted from the optical amplifier 105 is entered. When it is determined that the measured input level has exceeded the preset level (threshold) (step S18), the selection unit 154 of the variable optical attenuator 106 selects each of the controls by the high-speed controller 151, and the high-speed control is started (step S19).

Further, the flag extraction unit 153 of the variable optical attenuator 106 extracts an output control completion flag outputted from the optical amplifier 105 (step S20). The selection unit 154 of the variable optical attenuator 106 selects the control by the steady-state controller 152 of the variable optical attenuator 106, thus the control method of the variable optical attenuator 106 is switched from the high-speed control to the steady-state control (step S21). Then, the optical output measuring unit 156 of the variable optical attenuator 106 starts measuring the output level of the optical signal to be outputted. The optical output measuring unit 156 of the variable optical attenuator 106 determines that the output level of the optical signal to be outputted has been settled to the preset target level value (the optical output level is stabilized) (step S22). Subsequently, the flag inserting unit 157 of the variable optical attenuator 106 inserts the output control completion flag into the optical signal to be outputted, and the optical signal is outputted to the optical amplifier 107 (step S23).

On the other hand, in the optical amplifier 107, the level comparing unit 158 of the optical amplifier 107 measures the input level at which the optical signal outputted from the variable optical attenuator 106 is entered. When it is determined that the measured input level has exceeded the preset level (threshold) (step S24), the selection unit 154 of the optical amplifier 107 selects each of the controls by the high-speed controller 151, and the high-speed control is started (step S25).

Further, the flag extraction unit 153 of the optical amplifier 107 extracts an output control completion flag outputted from the variable optical attenuator 106 (step S26). The selection unit 154 of the optical amplifier 107 selects the control by the steady-state controller 152 of the optical amplifier 107, and the control method of the optical amplifier 107 is switched from the high-speed control to the steady-state control (step S27). Then, the optical output measuring unit 156 of the optical amplifier 107 starts measuring the output level of the optical signal to be outputted, and the optical output measuring unit 156 of the optical amplifier 107 determines that the output level of the optical signal to be outputted has been settled to the preset target level value (the optical output level is stabilized) (step S28).

Note that, in the system startup method described with reference to the flowchart of FIG. 3, the output control completion flag of the transmission apparatus in question is outputted after the output control completion flag outputted from the transmission apparatus in the previous stage is extracted. However, the output control completion flag of the transmission apparatus in question may be outputted before the output control completion flag outputted from the transmission apparatus in the previous stage is extracted. However, in this case, when the output control completion flag outputted from the transmission apparatus in the previous stage is extracted, the extracted output control completion flag has to be outputted to the transmission apparatus in the subsequent stage directly.

In addition, until the output control completion flag outputted from the previous stage is extracted by the flag extraction unit 153 of each apparatus, an alarm notification due to the detection of abnormality in optical signals outputted from the transmission apparatus connected to the previous stage is not performed. After the output control completion flag outputted from the previous stage is extracted by the flag extraction unit 153 of each apparatus, an alarm notification due to the detection of abnormality in optical signals outputted from the previous stage is performed. High-speed control means achieving acceleration of control by not performing lower priority processes, which are preset, among the processes in steady-state control. For example, the control is also accelerated by not performing alarm notification due to the detection of abnormality or the like outputted from the above described transmission apparatus in the previous stage.

In addition, when each apparatus shuts down, its own output control completion flag is returned to an uncompleted state.

Note that a level equalizer, a raman amplifier, an optical switch, a wavelength blocker or the like may be used in stead of the variable optical attenuators 104 and 106 shown in FIG. 1.

In addition, the variable optical attenuators 104 and 106 shown in FIG. 1 may be placed at the previous stage of the transmission paths 101 and 102, respectively.

2. Second Exemplary Embodiment

Apparatuses used in a transmission system include a signal transmitter-receiver, a light wavelength multiplexer, an optical demultiplexer, an optical amplifier, a variable optical attenuator, a level equalizer, a raman amplifier, an optical switch and a wavelength blocker. They may be applied to the system in which they are placed in any position, and connected in any order.

Figure 4:
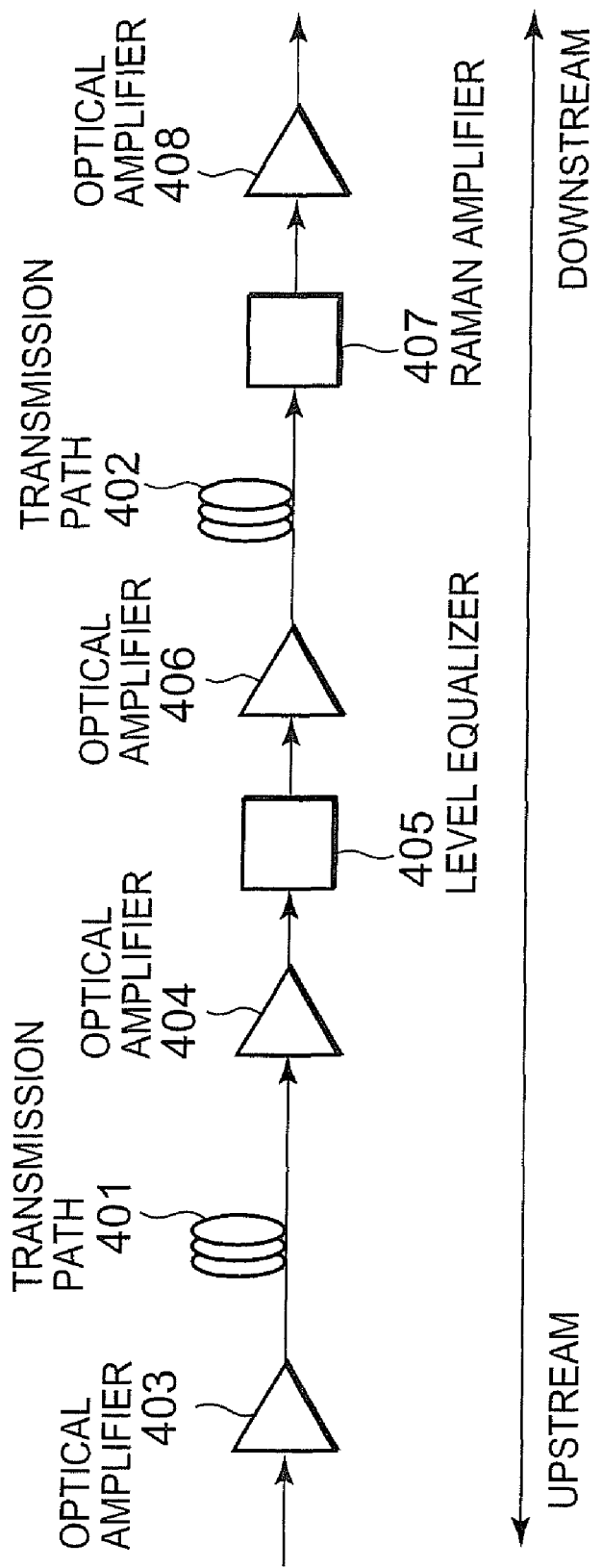
FIG. 4 is a diagram showing a second exemplary embodiment.

FIG. 4 is a diagram showing a second exemplary embodiment of a transmission system of the present invention.

The present exemplary embodiment is comprised of each transmission apparatus including optical amplifiers 403, 404, 406 and 408, a level equalizer 405 and a raman amplifier 407, as shown in FIG. 4. Further, the optical amplifier 403 and the optical amplifier 404 are connected through a transmission path 401. Further, the optical amplifier 406 and the raman amplifier 407 are connected through a transmission path 402.

The optical amplifiers 403, 404 and 408 amplify optical signals, which were outputted from the apparatus in the previous stage and attenuated in the transmission path, and output them to the apparatus and transmission path in the subsequent stage.

The level equalizer 405 absorbs power deviation for each wavelength of wavelength multiplexed signal light transmitted from the upstream side.

The optical amplifier 406 amplifies the signal attenuated by the level equalizer 405.

The raman amplifier 407 is used to amplify signals when the span loss of the previous transmission path (transmission path 402 in this case) is exceptionally large.

The output control completion flag described in the first exemplary embodiment is exchanged among these apparatuses.

3. Third Exemplary Embodiment

A transmission system including a ring structure is also applicable.

Figure 5:
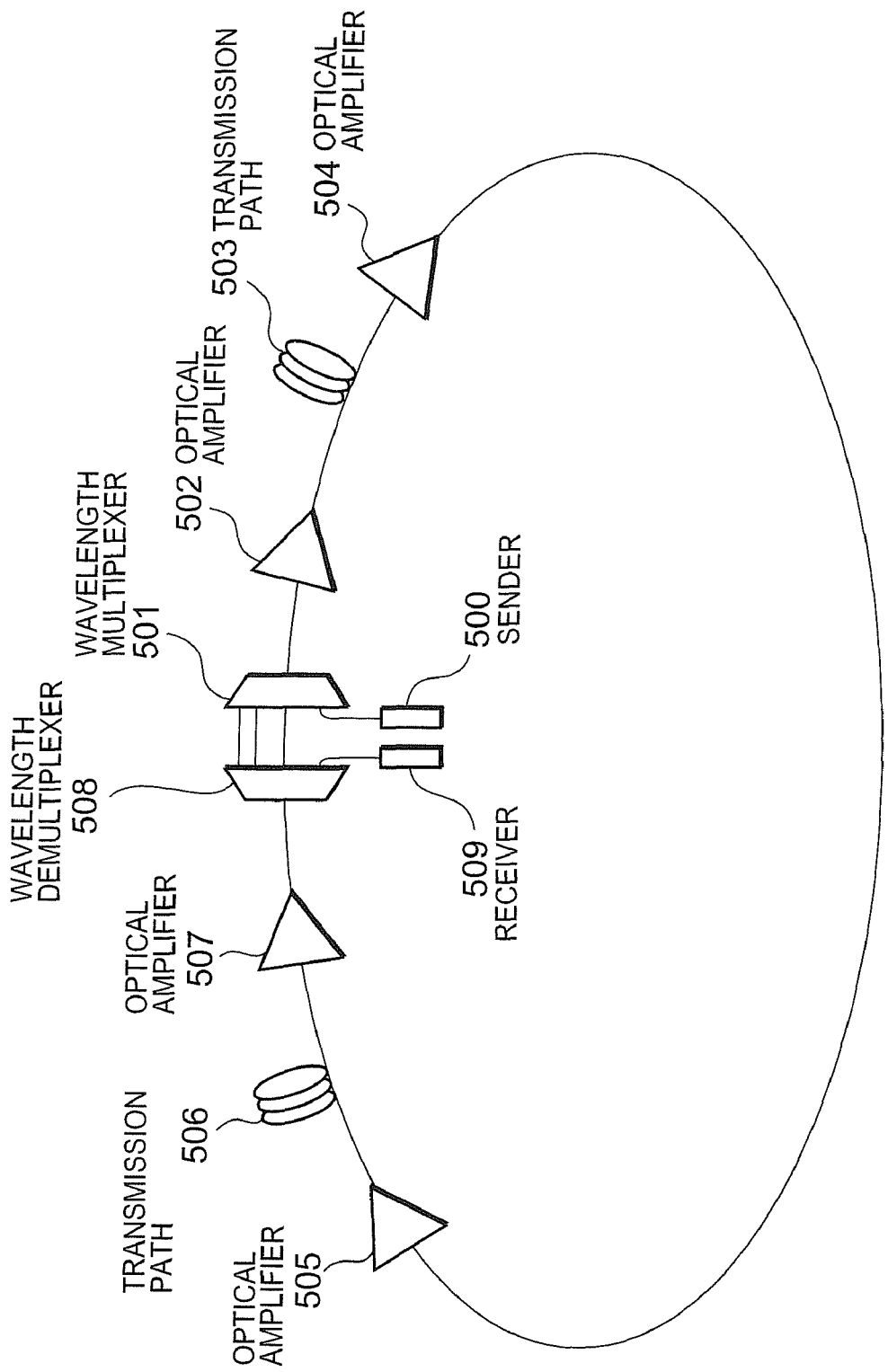
FIG. 5 is a diagram showing a third exemplary embodiment.
Figure 6:
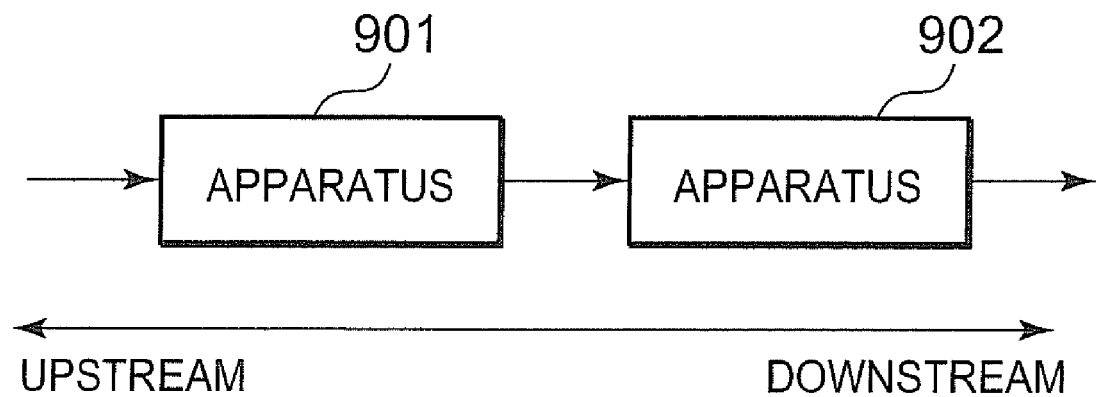
FIG. 6 is a sequence diagram showing an example of a related transmission system.

FIG. 5 is a diagram showing a third exemplary embodiment of a transmission system of the present invention.

As shown in FIG. 5, the present exemplary embodiment is comprised of a sender 500, a light wavelength multiplexer 501, optical amplifiers 502, 504, 505 and 507, a wavelength demultiplexer 508 and a receiver 509, each of which is a transmission apparatus. Further, the optical amplifier 502 and the optical amplifier 504 are connected through a transmission path 503. Further, the optical amplifier 505 and the optical amplifier 507 are connected through a transmission path 506. These components are connected in a ring shape.

The first apparatus to recover from shutdown (sender 500, in this case) becomes the most upstream apparatus, and the output control completion flag is transmitted to downstream apparatuses. After an apparatus raises an output control completion flag, if the control completion flag circles around and returns from upstream, the output control completion flag is ignored.

As described above, in the first to third exemplary embodiments, the output control completion flag is sequentially passed from the apparatus in the previous stage to the apparatus in the subsequent stage, and a switchover from high-speed output control during startup time to low-speed output control is accomplished. This allows the output level from shutdown to signal conduction time to be stabilized (unnecessary fluctuation in output level can be suppressed), and time for each apparatus to attain the target output to be reduced. In addition, the report of an alarm not intended to be detected can be prevented with respect to normal startup operation during signal conduction. In addition, even if the control speed of the upstream apparatuses of the transmission system changes, the control speed of downstream apparatuses and an alarm mask time do not have to be changed.

4. Fourth Exemplary Embodiment

In order to achieve the above objects, the present invention is a transmission system including a plurality of transmission apparatuses, which are connected in a multiple-stage fashion, wherein the transmission apparatus measures an input level of an optical signal outputted from a transmission apparatus connected to the previous stage of the transmission apparatus, performs high-speed control with a higher control speed than a steady-state control when the input level exceeds a preset level, extracts from an optical signal outputted from the transmission apparatus in the previous stage, an output control completion flag, which indicates the stabilization of the optical signal, performs a switchover from the high-speed control to the steady-state control after the output control completion flag is extracted, measures an output level of an optical signal outputted from the transmission apparatus, and, when it is determined that the output level has been settled to the target level value, outputs the output control completion flag to a transmission apparatus connected to the subsequent stage of the transmission apparatus.

5. Fifth Exemplary Embodiment

The transmission apparatus includes a level comparing unit for measuring an input level of an optical signal outputted from the transmission apparatus in the previous stage, and determining whether the input level has exceeded a preset level; a flag extraction unit for extracting from an optical signal outputted from the transmission apparatus in the previous stage, an output control completion flag, which indicates the stabilization of the optical signal; a selection unit for, when the level comparing unit determined that the input level has exceeded the preset level, selecting the high-speed control, and then, after the flag extraction unit extracts the output control completion flag, performing a switchover from the high-speed control to the steady-state control; an optical output measuring unit for measuring an output level of an optical signal outputted from the transmission apparatus, and determining whether the measured output level has reached a preset target level value; and a flag inserting unit for outputting an output control completion flag to a transmission apparatus connected to the subsequent stage of the transmission apparatus when the optical output measuring unit determined that the output level has been settled to the target level value.

6. Sixth Exemplary Embodiment

In addition, the transmission apparatus detects the abnormality in the optical signal after extracting the output control completion flag.

7. Seventh Exemplary Embodiment

In addition, a system startup method in a transmission system including a plurality of transmission apparatuses connected in a multi-stage fashion, includes steps of: the transmission apparatus measuring an input level of an optical signal outputted from a transmission apparatus connected to the previous stage of the transmission apparatus; the transmission apparatus determining whether the input level has exceeded a preset level; the transmission apparatus performing high-speed control with a higher control speed than a steady-state control when the input level exceeds the preset level; the transmission apparatus extracting from an optical signal outputted from the transmission apparatus in the previous stage, an output control completion flag, which indicates the stabilization of the optical signal; the transmission apparatus performing a switchover from the high-speed control to the steady-state control after extracting the output control completion flag; the transmission apparatus measuring an output level of an optical signal outputted from the transmission apparatus after extracting the output control completion flag; the transmission apparatus determining whether the measured output level has reached a preset target level value; and the transmission apparatus outputting an output control completion flag to a transmission apparatus connected to the subsequent stage of the transmission apparatus when determining that the output level has been settled to the target level value.

8. Eighth Exemplary Embodiment

In addition, the method includes a step of the transmission apparatus detecting the abnormality in the optical signal after extracting the output control completion flag.

According to the present invention, in transmission apparatuses, which are connected in a multiple-stage fashion, an input level of an optical signal outputted from a transmission apparatus connected to the previous stage of the transmission apparatus is measured, high-speed control with a higher control speed than a steady-state control is performed when the input level exceeds a preset level, a switchover is performed from the high-speed control to the steady-state control after, from an optical signal outputted from the transmission apparatus in the previous stage, an output control completion flag is extracted, which indicates the stabilization of the optical signal, an output level of an optical signal outputted from the transmission apparatus is measured, and the output control completion flag is outputted to a transmission apparatus connected to the subsequent stage of the transmission apparatus when it is determined that the measured output level has been settled to a target level value. This allows the level of an optical signal outputted from the system to be easily stabilized, and the startup time of the system to be reduced. In addition, since the present invention has a configuration in which, after, from an optical signal outputted from a transmission apparatus connected to the previous stage of the transmission apparatus, the output control completion flag is extracted, which indicates the stabilization of an optical signal, the abnormality in the optical signal is detected, notification of an incorrect alarm can be prevented.

According to the present invention constituted as described above, in transmission apparatuses, which are connected in a multiple-stage fashion, an input level of an optical signal outputted from a transmission apparatus connected to the previous stage of the transmission apparatus is measured, high-speed control with a higher control speed than a steady-state control is performed when the input level exceeds a preset level, a switchover is performed from the high-speed control to the steady-state control after, from an optical signal outputted from the transmission apparatus in the previous stage, an output control completion flag is extracted, which indicates the stabilization of the optical signal, an output level of an optical signal outputted from the transmission apparatus is measured, and the output control completion flag is outputted to a transmission apparatus connected to the subsequent stage of the transmission apparatus when it is determined that the measured output level has been settled to a target level value. In addition, after, from an optical signal outputted from a transmission apparatus connected to the previous stage of the transmission apparatus, an output control completion flag is extracted, which indicates the stabilization of the optical signal, the abnormality in the optical signal is detected.

This allows the output level from shutdown to signal conduction time to be stabilized (unnecessary fluctuation in output level can be suppressed), and time for each apparatus to attain the target output to be reduced. In addition, the report of an alarm not intended to be detected can be prevented with respect to normal startup operation during signal conduction. In addition, even if the control speed of the upstream apparatuses of the transmission system changes, the control speed of downstream apparatuses and an alarm mask time do not have to be changed.

The previous description of these embodiments is provided to enable a person skilled in the art to make and use the present invention. Moreover, various modifications to the embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A transmitter for transmitting an optical signal, comprising:
   a level comparing unit for measuring an input level of an entered optical signal, and determining whether the input level has exceeded a preset level;
   a controller for performing high-speed control of the level of an optical signal to be outputted when the input level exceeds the preset level; and,
   a flag extraction unit for extracting from the entered optical signal, a flag, which indicates the stabilization of the optical signal,
   wherein the controller performs a switchover from the high-speed control to a steady-state control after the flag extraction unit extracts the flag.

2. The transmitter according to claim 1,
   Wherein the transmitter detects the abnormality in the optical signal after the flag extraction unit extracts the flag.

3. The transmitter according to claim 1, further comprising:
   an optical output measuring unit for measuring an output level of an optical signal to be outputted, and determining whether the output level has reached a preset level value; and
   a flag inserting unit for inserting a flag into the optical signal when it is determined that the output level has been settled to the level value.

4. A transmission system for transmitting an optical signal, comprising
   a plurality of the transmitters according to claim 1 connected to each other through an optical transmission path.

5. A transmission method for transmitting an optical signal, comprising the steps of:

measuring an input level of an entered optical signal;
determining whether the input level has exceeded a preset level;
performing high-speed control of the level of an optical signal to be outputted when the input level exceeds the preset level;
extracting from the entered optical signal, a flag, which indicates the stabilization of the optical signal; and,
performing a switchover from the high-speed control to a steady-state control after extracting the flag.

6. The transmission method according to claim 5, further comprising a step of:

detecting the abnormality in the optical signal after extracting the flag.

7. The transmission method according to claim 5, further comprising steps of:

measuring an output level of an optical signal to be outputted;
determining whether the output level has reached a preset level value; and
inserting a flag into the optical signal when it is determined that the output level has been settled to the level value.

* * * * *